US007058267B2

(12) United States Patent
Neuhaus et al.

(10) Patent No.: US 7,058,267 B2
(45) Date of Patent: Jun. 6, 2006

(54) METHOD FOR MANUFACTURING OF AN OPTICAL FIBER WITH A DECOUPLING INTERFACE FOR SCATTERED LIGHT, USE OF AN OPTICAL FIBER AND DEVICE FOR MONITORING OF THE LIGHT POWER GUIDED THROUGH AN OPTICAL FIBER

(75) Inventors: Rudolf Neuhaus, Munich (DE); Frederik Popp, Munich (DE); Harald Rossmeier, Woerthsee (DE)

(73) Assignee: Toptica Photonics AG (DE)

( * ) Notice: Subject to any disclaimer, the term of this patent is extended or adjusted under 35 U.S.C. 154(b) by 115 days.

(21) Appl. No.: 10/712,765

(22) Filed: Nov. 12, 2003

(65) Prior Publication Data

US 2005/0002607 A1    Jan. 6, 2005

(30) Foreign Application Priority Data

Nov. 12, 2002    (DE)    ................................ 102 52 612

(51) Int. Cl.
*G02B 6/26* (2006.01)
*G02B 6/42* (2006.01)

(52) U.S. Cl. ............................ 385/48; 385/39; 385/95; 385/97; 385/98; 385/99; 385/123; 385/125; 250/573; 250/574; 250/576; 65/406; 65/407

(58) Field of Classification Search ................ 385/8–9, 385/29, 30–31, 38, 39–40, 48, 50, 52, 55, 385/58, 70, 95–99, 134–137, 140; 250/227.11, 250/227.14, 227.15, 227.18, 227.28, 573–574, 250/576; 65/406–407
See application file for complete search history.

(56) References Cited

U.S. PATENT DOCUMENTS

| | | | |
|---|---|---|---|
| 3,936,631 A | 2/1976 | Muska | 250/227 |
| 4,165,496 A | 8/1979 | Di Domenico, Jr. et al. | 331/94.5 |
| 4,371,897 A | 2/1983 | Kramer | 358/294 |
| 4,398,795 A | 8/1983 | Palmer | 350/96.19 |
| 4,466,697 A | 8/1984 | Daniel | 350/96.3 |
| 4,475,789 A | 10/1984 | Kahn | 350/96.15 |
| 4,618,211 A | 10/1986 | Fleury | 350/96.15 |
| 4,728,170 A * | 3/1988 | Robertson | 385/140 |
| 4,781,428 A | 11/1988 | Epworth et al. | 350/96.19 |

(Continued)

FOREIGN PATENT DOCUMENTS

DE    43 13 795    11/1994    ...................... 6/32

(Continued)

*Primary Examiner*—Brian Healy
*Assistant Examiner*—Ryan Lepisto
(74) *Attorney, Agent, or Firm*—Niky Economy Syrengelas, Esq.; K. David Crockett, Esq.; Crockett & Crockett

(57) ABSTRACT

Method for manufacturing of an optical fiber with a decoupling interface for scattered light to monitor the power of light guided through the optical fiber, where the optical fiber has a core having a first refractive index and a cladding surrounding the core, the cladding having a second refractive index smaller than the first refractive index, and where a portion of the optical fiber is substantially straightly aligned in the region of the decoupling interface, in which method the optical fiber is electro-thermally treated at an intermediate position within the substantially straightly aligned portion such that a partial mixture of core material and cladding material and, thereby, formation of scattering centers occurs in an interface region between the core and said the cladding, thereby forming the decoupling interface for scattered light from the modified intermediate position.

20 Claims, 4 Drawing Sheets

U.S. PATENT DOCUMENTS

| | | | |
|---|---|---|---|
| 4,887,879 A | 12/1989 | Prucnal et al. | 350/96.15 |
| 4,923,273 A | 5/1990 | Taylor | 350/96.21 |
| 5,039,188 A | 8/1991 | Williams | 385/32 |
| 5,080,506 A | 1/1992 | Campbell et al. | 385/29 |
| 5,560,760 A * | 10/1996 | Toeppen | 65/407 |
| 5,591,964 A | 1/1997 | Poole | 250/227.14 |
| 5,897,803 A * | 4/1999 | Zheng et al. | 219/383 |
| 6,062,743 A * | 5/2000 | Zheng et al. | 385/95 |
| 6,125,225 A * | 9/2000 | Dianov et al. | 385/124 |
| 2001/0002944 A1 * | 6/2001 | Bohnert et al. | 385/123 |
| 2002/0197027 A1 * | 12/2002 | Saito et al. | 385/96 |
| 2003/0031432 A1 * | 2/2003 | Sykora et al. | 385/96 |

FOREIGN PATENT DOCUMENTS

| | | | |
|---|---|---|---|
| DE | 43 14 031 | 11/1994 | 6/22 |
| EP | 0 619 506 | 3/1994 | 6/28 |
| EP | 1 014 131 | 1/1999 | 6/42 |
| EP | 1 008 876 | 12/1999 | 6/26 |
| JP | 55 035350 | 3/1980 | 7/26 |

* cited by examiner

METHOD FOR MANUFACTURING OF AN OPTICAL FIBER WITH A DECOUPLING INTERFACE FOR SCATTERED LIGHT, USE OF AN OPTICAL FIBER AND DEVICE FOR MONITORING OF THE LIGHT POWER GUIDED THROUGH AN OPTICAL FIBER

DESCRIPTION

FIELD OF INVENTION

The present invention relates to optical fibers and in particular to the manufacturing of an optical fiber with a decoupling interface for scattered light and to the measuring of the optical power guided through said optical fiber. A method for manufacturing of an optical fiber with a decoupling interface for scattered light and a use of an optical fiber as well as a device for monitoring of the light power guided through said optical fiber are presented. The use of the optical fiber for monitoring is especially applicable for controlling the light power of a light source or alternatively for controlling the mechanism of coupled light from the light source into the optical fiber.

BACKGROUND OF THE INVENTION

Throughout the following, the term "optical fiber" shall be understood as a fibrous dielectric body comprising a first region with comparatively high refractive index (so called "core") and a second region with comparatively low refractive index (so called "cladding"), the second region surrounding the first region. In addition, the cladding can be surrounded by an outer protection layer (so called "coating"). An optical fiber is optimized for low-loss guiding of electromagnetic radiation in the ultraviolet, visible or infrared regions.

FIG. 1a shows a schematic cross-section of an optical fiber 100 taken perpendicular to the fiber axis, the optical fiber 100 comprising a core 101, a cladding 102, a coating 103, and an interface surface 104 between the core 101 and the cladding 102. FIG. 1b shows the refractive index profile 110 of the optical fiber 100 corresponding to the cross-section shown in FIG. 1a. FIG. 1b shows the refractive indices n as a function of the radius of the optical fiber 100 of FIG. 1a as bar diagram (not to scale). The magnitude of the refractive indices n increases from left to right within the refractive index profile 110, as indicated by the arrow 111. The core 101 has a first refractive index $n_1$ and, therefore, the core 101 is represented by a first bar 101a with great width. The cladding 102 surrounding the core 101 has a second refractive index $n_2$ being smaller than the first refractive index $n_1$ of the core 101. Therefore, the cladding 102 is represented in the refractive index profile 110 by two second bars 102a of medium width being adjacently positioned above and below the first bar 101a, respectively. The coating 103 enveloping the cladding 102 has a third refractive index $n_3$ smaller than the second refractive index $n_2$ of cladding 102 and is therefore represented by two third bars 103a of small width being adjacently positioned above and below the respective second bar 102a, respectively. As shown in FIG. 1b, at the interface surface 104 between the core 101 and the cladding 102 there is a refractive index step 104a between the first refractive index $n_1$ of the core 101 and the second refractive index $n_2$ of the cladding 102.

Guiding of electromagnetic radiation in the core 101 of the optical fiber 100 is achieved by total reflection at the interface surface 104 due to the refractive index step 104a. Usually, an electromagnetic ray is incident upon the interface surface 104 between the core 101 and the cladding 102 with an angle $\alpha_1$ being greater than the critical angle for total reflection $\alpha_G$, i.e. $\alpha_1 > \alpha_G$ is fulfilled, and is totally reflected there ($\alpha_1$ and $\alpha_G$ are taken relative to the surface normal of the interface surface 104).

Throughout the following, the term "laser-active optical fiber" shall be understood as an optical fiber having the core doped with a laser-active material, for example with a rare earth composition. Absorption of optical energy (so called "pump light") coupled into the optical fiber leads to a population inversion of the energy levels of the doping material in the core of the fiber, so that light amplification results for one wavelength or for several wavelengths. Laser-active optical fibers can be operated both as fiber lasers or fiber amplifiers.

Throughout the following, the term "photonic crystal fiber" shall be understood as an optical fiber which is internally structured namely usually by means of microscopically small holes in quartz glass. This structuring leads to a photonic band gap, so that light of a particular range of wavelengths is guided through the optical fiber.

Throughout the following, the term "fiber splice" shall be understood as a connection between two optical fibers which is not adapted to be separated and connected frequently, but is rather optimized as a permanent connection to show low radiation loss at the connecting position. Typically, the fiber ends are welded to each other, for example by means of a heat operation or an electric arc, to form a fiber splice.

The prior art discloses miscellaneous methods to draw off part of the light guided within an optical fiber (so called "tapping") and to detect it. A plurality of these known methods is based on a mechanical modification of an optical fiber.

In this respect, U.S. Pat. No. 4,398,795 and EP 0619506 describe how the guided light can be tapped by fixing of an optical fiber and cutting into or polishing the fiber cladding. In EP 1014131 the use of a connecting piece made of light guiding material is taught, which connecting piece removes the coating and the cladding of an optical fiber so that the fiber core is uncovered and light can be coupled into the connecting piece.

In EP 1008876 is described a method for extracting light out of an optical fiber, wherein the optical fiber is impressed and deformed. For example, a wedge can be pressed onto the fiber for this. Due to the deformation, reflecting surfaces can be created in the optical fiber, which reflecting surfaces reflect a part of the light to a suitably positioned detector.

According to U.S. Pat. No. 4,781,428, a periodic spatial deformation of an optical fiber can be used in order to tap light out of the optical fiber. For this, the optical fiber can, for example, be pressed against a solid grid-like structure. At certain optical frequencies which are determined by the period of the grid mode-mixing is achieved, such as between core modes and cladding modes of the optical fiber. The cladding modes can be taped out of the optical fiber. The intensity of the decoupled light can be varied by varying the strength of the contact pressure.

Besides pure mechanical modifications of the fiber structure, the prior art also discloses methods which apply chemical techniques.

In U.S. Pat. No. 4,887,879 a tapping device is described, wherein at first cladding modes are induced in an optical fiber, which cladding modes are subsequently detected at a tapered position of the optical fiber. The tapering is produced, for example, by chemically etching away a part of the fiber cladding after removal of the cladding.

The prior art methods described above have one or several of the following disadvantages: The mechanical stability of the optical fiber is reduced due to the weakening of the fiber structure. Manufacturing of the described devices is often complicated, laborious and expensive, and involves the danger of unintentional damaging or destroying of the optical fiber, especially of the fiber core. Methods which comprise a mechanical or chemical narrowing of the fiber cladding further have the disadvantage, that the decoupled light is scattered preferably at very small angles with respect to the propagation direction. This complicates the light detection and/or necessitates complex assemblies for this.

A second group of methods employs a sufficiently tight bending of an optical fiber in order to extract a part of the light power. An example of one such "bending coupler" is described in U.S. Pat. No. 3,936,631. A device for monitoring the light power guided within an optical fiber is demonstrated in U.S. Pat. No. 5,080,506 wherein at first the modes propagating in the cladding are removed by applying a so called "mode stripper", i.e. a material with a refractive index equal to or greater than that of the cladding. Subsequently, a part of the guided light power is coupled out by a bending coupler.

In U.S. Pat. No. 5,591,964 a battery driven or solar cell driven device for measuring the power guided within an optical fiber is described, wherein a part of the light power is removed from the optical fiber by applying a "microbend". Such a micro-bend is produced by tightly bending the optical fiber at some position with a bending radius of preferably <2 mm, in doing so the temperature of the optical fiber is raised above the melting point for a short period of time due to a local heating. After cooling down, the micro-bend is mechanically fixed to the optical fiber. The micro-bend at the optical fiber leads to the effect that light rays reaching the core of the optical fiber in the region of the micro-bend are incident upon the interface surface between the core and the cladding of the optical fiber at an angle of $\alpha_2$ being smaller than the critical angle $\alpha_G$ of total reflection, i.e. $\alpha_2 < \alpha_G$ is fulfilled ($\alpha_2$ and $\alpha_G$ are taken relative to the surface normal of the interface surface). Therefore, in the region of the micro-bend the light rays are not totally reflected, but are partially decoupled out of the optical fiber through the cladding.

One disadvantage of such devices is the difficult reproducibility of the decoupled intensity, because the portion of decoupled power depends on the structure and composition of the respective optical fiber. In addition, the danger of a break of the fiber exists, unless laborious measures are taken to avoid it U.S. Pat. No. 5,039,188 describes a bending coupler with devices which apply compression pressure to an optical fiber in a suitable way, in order to reduce the risk of a break of the fiber). The extensive spatial distribution of the light radiated out presents another disadvantage of such devices. It is therefore difficult to collect this light on a small photo detector which affects the applicability of such couplers for fast controls.

Thermally manufactured micro-bends, as shown in U.S. Pat. No. 5,591,964, are critically mechanically stable and additionally include a manufacturing challenge because at least two parameters (temperature and bending radius) have to be monitored during manufacturing. This increases the risk of damaging the optical fiber, for example as a result of a too high or too long influence of temperature.

In another group of methods, the fiber is severed in order to tap a part of the light power. In U.S. Pat. No. 4,165,496 is described a beam splitter which is realized by exactly coaxial aligning two fiber pieces with skew beveled end surfaces being parallel to each other. At the end surfaces, light is reflected out of the optical fiber. This method, however, requires an extremely precise and therefore laborious adjustment. In addition, there is the risk that mechanical agitations cause an offset of the fiber pieces, thereby disconnecting the light guide.

Advancements of this idea include the production of joint positions by splicing of fiber pieces. In U.S. Pat. No. 4,475,789 a fiber-optic power monitor is demonstrated, wherein two optical fibers having different mode volumes are spliced together. Thereby, the mode volume of the second optical fiber is smaller than that of the first optical fiber, such that a part of the light guided through the first optical fiber cannot propagate through the second optical fiber. The scattered light resulting at the splice position is detected and serves as control signal for a power control.

The method described in U.S. Pat. No. 4,165,496 requires optical fibers with different mode volumes, for example optical fibers with different refractive index profiles are applied. However, in case of single-mode waveguides—in particular for less common wavelengths—suitable optical fibers with different refractive index geometry are difficult to obtain, if at all. This method is further disadvantageous for the use of multi-mode waveguides when the ray profile or the transverse mode structure, respectively, of the light source changes, for example due to power variations of a laser light source or due to a mechanical impact onto the optical fiber (for example as a result of touching). In this case, the ratio of the light power guided in the two optical fibers may change. This method is therefore susceptible for errors concerning its ability to measure the power guided in the second optical fiber.

In U.S. Pat. No. 4,475,789 a method is taught, wherein an optical fiber is severed, and one of the resulting end surfaces is coated within a vacuum apparatus with dielectric material (e.g. $TiO_2$) or a metal (e.g. Ti). Subsequently, the fiber pieces are spliced with each other again. While doing so, electric arcs are applied until a desired reflectivity is obtained at the connection position.

Major disadvantages of this method are the technical manufacturing effort for specially manufactured optical fibers due to the vacuum coating, and the accompanying apparatus costs. For the manufacturing of these specially manufactured optical fibers, in particular an optical fiber is severed perpendicular to the fiber axis, such that two fiber ends result. In a vacuum apparatus, the end surface of one of these fiber ends is coated with a suitable refractive material or reflective material, respectively. Thereafter, the coated and uncoated fiber-ends are spliced together at their end surfaces. The manufacturing therefore requires at least one laborious vacuum coating process. Further, there exists the risk that the transmission characteristics of such an optical fiber are deteriorated due to unwanted absorption by this refractive material or reflective material, respectively.

Furthermore, other methods apply doping of the optical fiber with extrinsic atoms or particles in order to decouple a part of the light by reflection or refraction. According to U.S. Pat. No. 4,923,273, scattered light can be generated by utilizing means (e.g. chemical admixtures) incorporated into the optical fiber, which means modify one or more fiber parameters. This publication refers in particular to "activatable means", for example extrinsic atoms evoking a change of refractive index (or another fiber parameter) due to the impact of electromagnetic radiation, due to heat, or due to bombardment with electrons or ions.

A disadvantage of these devices consists in increased material costs that arise as a result of the use of specially manufactured optical fibers. In addition, there is the risk that as a result of undesired absorption in such specially manufactured optical fibers the transmission properties of such an optical fiber are deteriorated.

The application of light scattering or light refracting particles in the core of a light guide is described in U.S. Pat. No. 4,618,211. If the particles are incorporated during the manufacturing of the fiber, the optical fiber emits scattered light along its whole length. Alternatively, at first the fiber core is formed which is treated by means of heat or radiation in order to generate light deflecting defects. Or the optical fiber is irradiated by ionizing radiation or laser light after completion, thereby provoking microscopic deficiencies in the structure of the fiber core.

If the particles are incorporated during manufacturing of the fiber, the disadvantage of high damping of the guided light occurs here as well. In addition, the relative portion of the decoupled light power is difficult to control. On the other hand, in the publication it is pointed out, that the possibilities mentioned therein are not well suited to incorporate scattering centers only after completion of the optical fiber.

In U.S. Pat. No. 4,466,697 an optical fiber is described, whose core is interspersed with light scattering particles as scatter centers. These light scattering particles can be incorporated into the core by admixing adequate material in the melt from which the core of the optical fiber is drawn, and by spraying adequate material onto the core, before creation of the cladding.

A device and a method to monitor the light guided through an optical fiber are known from DE 4313795. Therein an optical fiber is enveloped by a glass tube in the vicinity of a joint position (but not at the joint position itself). This glass tube is filled with an adhesive and guides scattered light to a detector, which scattered light is radiated out of the core of the optical fiber into the cladding at the joint position and is transferred from there into the glass tube.

From DE 4314031 a means for monitoring and protecting optical waveguide (OWG) cables is known, said means detecting energy leakage on account of a malfunction out of an OWG cable or an OWG fiber. The damage of the OWG cable occurs due to uncontrolled decoupling of the laser rays at defects of the OWG cable, for example based on a minor case of falling below the allowed bending radius.

A method for monitoring a splicing process when splicing two optical fibers to each other is described in JP 55035350. Shortly prior to the splicing operation, light is transmitted through the two optical fibers. The scattered light emanating at the position to be spliced is detected by a detector and the two optical fibers are adjusted relative to each other such that the detector does not detect scattered light any more. In this way, an optimal adjusting of the two optical fibers relative to each other is obtained, i.e. the two optical fibers are spliced to each other only if an optimal transmission of light through the two optical fibers has been reached.

In U.S. Pat. No. 4,371,897 a spatially quantitative light detector is disclosed comprising an optical fiber and a photo sensor coupled to the optical fiber. The core of the optical fiber is interspersed by a fluorescing substance. Light incident upon the surface of the optical fiber is guided through the optical fiber to the photo sensor and is detected there by the photo sensor.

SUMMARY OF THE INVENTION

An object of the present invention is to realize a power monitor for monitoring the light power guide within an optical fiber the power monitor being inexpensive and compact, and being able to be manufactured simply reproducibly and automatically.

In addition, an assembly with a high mechanical stability, in particular a long-term stability, shall be realized, such that there is no risk of unintentionally damaging the optical fiber.

In order to monitor the guided power, a decoupling of a light signal is to be done in such a way, that there exists a defined and controllable damping of the transmitted light.

Further, the detection of the light signal emanating from the optical fiber shall be improved by means of scattering centers, without unintentionally affecting the guided light power.

Another object of the invention is to provide a method for monitoring the light power guided through an optical fiber, the method being applicable for single-mode and multi-mode fibers, for passive and laser-active optical fibers, as well as for photonic crystal fibers.

The above mentioned problems are solved with the features according to the independent claims by a method for manufacturing of an optical fiber with a decoupling interface for scattered light, a use of an accordingly manufactured optical fiber as well as a device for monitoring the light power guided through an optical fiber.

In a method for manufacturing of an optical fiber with a decoupling interface for scattered light for monitoring the power of light guided through said optical fiber, said optical fiber comprising a core having a first refractive index and a cladding surrounding said core, said cladding having a second refractive index being smaller than said first refractive index, and a portion of said optical fiber in a region of said decoupling interface being substantially straightly aligned, said optical fiber is electro-thermally treated at an intermediate position within said substantially straightly aligned portion in such a way, that a partial mixture of core material and cladding material and, thereby, formation of scattering centers occurs in an interface region between said core and said cladding, thereby forming said decoupling interface for scattered light from said so modified intermediate position.

Within the context of this application, a "substantially straightly aligned portion of an optical fiber" shall be understood as a portion of an optical fiber, which portion is either straight or which otherwise has at most such a bending, that within this region incoming light rays are always incident upon the interface layer between the core and the cladding at an angle $\alpha_3$ being greater than the critical angle $\alpha_G$ of total reflection, i.e. $\alpha_3 > \alpha_G$ is fulfilled ($\alpha_3$ and $\alpha_G$ are taken relative to the surface normal of the angle $\alpha_3$ interface layer). Therefore, in the "substantially straightly aligned portion of an optical fiber", light rays are always guided through the optical fiber by total reflection.

Said method is distinguished in that it only needs a small technical effort for manufacturing, and that it can be carried out with a high repeatability.

The principle of the invention is, illustratively, that at an intermediate position an optical fiber is modified in its structure by means of an electro-thermal treatment, said optical fiber being substantially straightly aligned at said intermediate position, i.e. a partial mixture of core material and cladding material in said interface region between said core and said cladding is effected, such that scattered light emanates out of said optical fiber at the at least one intermediate position. Said partial mixture of core material and cladding material in said interface region between said core and said cladding effects the insertion of isolated scattering centers for incoming light rays into the peripheral region of said core, which scattering centers deflect the direction of incident light rays in such a way, that these are incident upon said interface layer at an angle $\alpha_2$. This angle $\alpha_2$ is smaller than said critical angle $\alpha_G$ of total reflection only for said light rays scattered at said scattering centers, i.e. it is $\alpha_2 < \alpha_G$ fulfilled ($\alpha_2$ and $\alpha_G$ refer to the surface normal of said interface layer). Therefore, said light rays deflected at said scattering centers are not totally reflected, but are decoupled from said optical fiber via said interface layer and said cladding. A part of the light coupled into said optical fiber is therefore not guided further through said optical fiber, but emanates out of said optical fiber as scattered light. Said scattered light can be detected by a detector and, then, can give a measurement value for the light power guided through said optical fiber.

Preferably, said optical fiber is severed substantially perpendicular to the fiber axis at said intermediate position prior to the electro-thermal treatment, such that two free fiber ends result, and said two free fiber ends-are directly spliced to each other at their front surfaces, such that said two spliced fiber ends are substantially straightly aligned. Consequently, the electro-thermal treatment according to the present invention is performed as a subsequent treatment of said spliced intermediate position. Splicing of said two fiber ends may in particular be done with a small lateral offset of said fiber ends.

Alternatively, said electro-thermal treatment is carried out directly at a mechanically undamaged intermediate position of said optical fiber.

Preferably, during said electro-thermal treatment of said optical fiber, the power of the light being guided through said optical fiber is monitored and said electro-thermal treatment is completed as soon as a desired damping of said power is achieved.

Preferably, in the method according to the present invention, said decoupling interface is surrounded by a light scattering, light refracting or light reflecting material, or by a material being light absorbing and subsequently light emitting, such that the portion of detectable scattered light is modified, in particular increased.

Said electro-thermal treatment of said intermediate position may be carried out by a single electric arc. It is also possible, however, to apply several successive electric arcs with time intervals between each other. In the latter case, the intensity of said electric arcs may in particular vary, i.e. primarily the temporal duration of said individual electric arcs may be varied, thereby a varying power may be coupled into said intermediate position to be treated.

In a preferred embodiment of the invention, a detector for detecting scattered light emitted from said decoupling interface of said optical fiber is provided at said decoupling interface. Said detector may be used as an actual-value transducer in a control loop being able to control the power of the light guided through said optical fiber.

Preferably, at least one intermediate position is surrounded by a granular material or by a fluorescent or phosphorescent material, whereby the number of scattering centers at said decoupling interface is increased. Thereby, said usable light signal at said detector can be increased. This granular or fluorescent or phosphorescent material can be mixed with an adhesive, which adhesive itself is utilized in order to fix said optical fiber.

Said granular material may be glass powder, for example with a particle diameter of <100 µm, preferably with a particle diameter of between 40 µm and 60 µm. The fluorescent or phosphorescent material is selected such that said fluorescent or phosphorescent material serves for a wavelength-conversion of said scattered light, in order to adapt said scattered light to the sensitivity of said detector.

In order to protect said detector from ambient light, said detector and said decoupling interface may be commonly surrounded by an absorbing material. Said detector is thereby protected from scattered light coming from undesired directions. Said absorbing material may be mixed with an adhesive, which adhesive is used to fix said detector. Said absorbing material may in particular be silicon carbide or carbon powder.

According to the present invention, as optical fiber may be utilized an optical fiber provided with at least one of the following features: the feature of a single-mode fiber, of a multi-mode fiber, of a polarization-preserving optical fiber, of a laser-active optical fiber, or of a photonic crystal fiber.

Preferably, the light power after passage through said optical fiber is correlated to the scattered light detected by said detector. In particular, the light power after passage through said optical fiber is directly proportional to said scattered light detected by said detector.

Light from a light source is transmitted through said optical fiber. Said scattered light emitted out of said optical fiber and detected by said detector is subsequently preferably used to control the power of said light source and/or to control the coupling efficiency of said light from said light source into said optical fiber. Illustratively, the measured signal of said detector is calibrated with respect to the output power, and said signal can subsequently serve as actual-value of a control loop regulating the power of said light source in-coupled into said optical fiber or regulating the mechanism of in-coupling of said light source into said optical fiber.

A device according to the present invention with a control loop for controlling said power of light of a light source, said light being guided through an optical fiber, comprises an optical fiber which is manufactured according to the manufacturing method described in the present invention, and whose detector is connected to said control loop as an actual-value transducer.

Preferably, in the device according to the present invention said decoupling interface is surrounded by fluorescent or phosphorescent material for a wavelength conversion of said scattered light.

BRIEF DESCRIPTION OF THE DRAWINGS

Embodiments of the present invention are shown in the figures and will be further described hereinafter. Therein, same components are referred to by the same reference signs.

In the figures:

FIG. 1b shows a refractive index profile of the optical fiber shown in FIG. 1a;

FIG. 2b shows a refractive index profile of the decoupling interface according to the present invention for scattered light from the optical fiber shown in FIG. 2a;

DETAILED DESCRIPTION OF PREFERRED EMBODIMENTS OF THE INVENTION

Figure 2A:
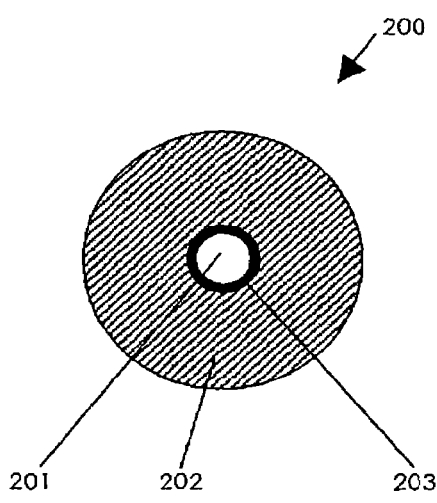
FIG. 2a shows a schematic cross-section of a decoupling interface according to the present invention for scattered light from an optical fiber.

FIG. 2a shows a schematic cross-section of a decoupling interface 200 according to the present invention in an optical fiber, taken perpendicular to the fiber axis.

Figure 1A:
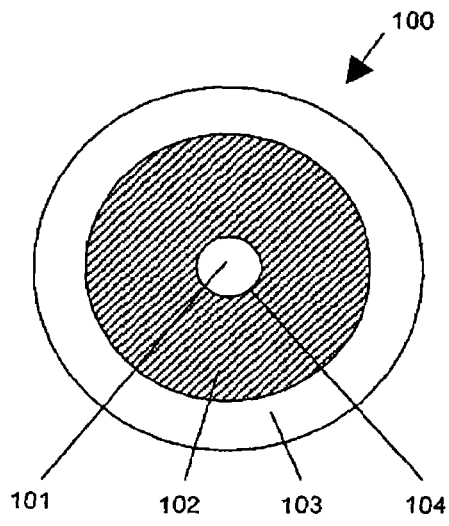
FIG. 1a shows a schematic cross-section of an optical fiber.
Figure 1B:
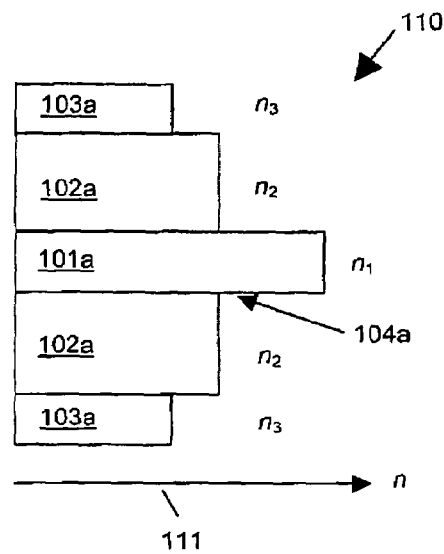

The decoupling interface 200 according to the present invention is a modification of the optical fiber 100 described in FIG. 1a and FIG. 1b. At the decoupling interface 200 and in the center of the modified optical fiber is shown the core 201 surrounded by the cladding 202. Due to the method for manufacturing this decoupling interface 200, as described hereinafter, a coating layer comparable to coating layer 103 of the optical fiber 100 is missing. The core 201 comprises a core material with a first refractive index $n_1$ and the cladding 202 comprises a cladding material with a second refractive index $n_2$, the second refractive index $n_2$ being smaller than the first refractive index $n_1$ ($n_2<n_1$). An interface region 203 is situated between said core 201 and said cladding 202, in which interface region 203 core material and cladding material are partially mixed. The partial mixture of core material and cladding material extends only into the peripheral border region of said core 201, such that the damping of light power transmitted through the optical fiber is as small as possible.

Figure 2B:
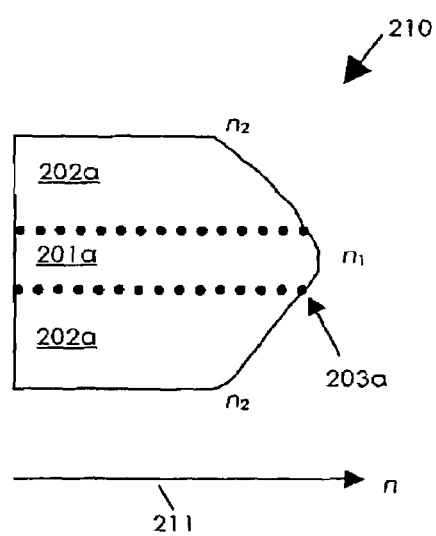

FIG. 2b shows a refractive index profile 210 of the decoupling interface 200 according to the present invention for scattered light from the optical fiber shown in FIG. 2a.

The refractive index profile 210 shown in FIG. 2b corresponds to the schematic cross-section of FIG. 2a of the optical fiber at the decoupling interface 200. Refractive index profile 210 shows as a bar diagram (not to scale) of the refractive indices n of the optical fiber at the decoupling interface 200 of FIG. 2a. Within the refractive index profile 210, the size of the refractive indices n is increasing from left to right, as shown by arrow 211. The first refractive index $n_1$ of the core 201 is symbolized by a broad bar 201a. Within the refractive index profile 210, the refractive index of the cladding 202 is symbolized by two trapezoids 202a with parallel sides of unequal length, the trapezoids 202a being adjacently above and below, respectively, of the broad bar 201a. As shown in FIG. 2b, within the interface layer 203 between the core 201 and the cladding 202 there exists a continuous transition 203a of the refractive index between the first refractive index $n_1$ of the core 201 and the second, refractive index $n_2$ of the cladding 202 at that side of cladding 202, which is opposite to the core 201.

Since the extension of the decoupling interface 200 along the fiber axis (i.e. perpendicular to the drawing plane of FIG. 2a) is at most a few mm, the transmission of light through the optical fiber occurs by total reflection. At the decoupling interface 200, though, the partially mixed material of the core 201 and the cladding 202 in the interface region 203 provides scattering centers (not shown). These scattering centers scatter light transmitted through the optical fiber in the peripheral region of the core 201 in a way, that this light is incident upon the interface layer 203 between the core 201 and the cladding 202 with an angle $\alpha_2$ being smaller than the critical angle $\alpha_G$ of total reflection, i.e. $\alpha_2<\alpha_G$ is fulfilled. There, the light is therefore partially transmitted through the interface layer 203 and the cladding 202 ($\alpha_2$ and $\alpha_G$ refer to the surface normal of the interface layer 203).

According to the shown embodiment, a commercially available single-mode fiber of quartz glass is used as optical fiber, said fiber being able to transmit violet light in the range from 390 nm to 410 nm. This single-mode fiber may have the following data: the core has a diameter of 3 μm and a refractive index of 1.4735, the cladding has a thickness of about 125 μm and a refractive index of 1.4695 and the coating made of acrylate has a thickness of 200 μm. The core and the cladding comprise quartz, wherein either the core or the cladding is appropriately doped in order to reach the respective refractive indices.

For the manufacturing of the decoupling interface 200, at first the coating is stripped from an intermediate position of the optical fiber 100, said intermediate position being arranged in a substantially straight portion of the optical fiber 100. Subsequently, the intermediate position is electro-thermally treated. The intermediate position can be a mechanically uninjured intermediate position or a splice position, at which splice position an optical fiber being firstly severed has been spliced again (in this respect, details are described with reference to FIG. 3 to FIG. 5).

According to the present invention, a commercially available splicing device is utilized for the electro-thermal treatment of the intermediate position, which intermediate position subsequently becomes the decoupling interface 200. In this embodiment of the present invention a splicing device of the company Sumitomo Electric, type 36, is applied. This splicing device comprises two electrode tips with a distance of 1.5 mm, between which the intermediate position to be treated is positioned centrally, the fiber axis of the optical fiber being essentially perpendicular to the connecting line between the two electrode tips.

At least one electric arc is ignited between the two electrode tips of the splicing device, a voltage of 12 kV being applied to the electrodes for each electric arc, and a current of 13 to 14 mA is assigned to each electric arc for a duration of 0.5 to 2 s, in particular of 1 s. Thereby, a temperature of 3,500° C. to about 4,500° C. is reached in the electric arc, which is substantially higher than the melting temperature of quartz being in the range between 1,700° C. and 1,800° C.

Each electric arc has a diameter of about 1 to 2 mm. Since the optical fiber has a diameter of 250 μm at the intermediate position, each electric arc encloses the optical fiber at the intermediate position. Along the fiber axis of the optical fiber, the optical fiber is therefore partially melted at its periphery at a length of 1 to 2 mm (according to the diameter of the arc), resulting in a partial mixture of cladding material and core material. For that, the temporal duration of each electric arc is adjusted in such a way, that cladding material can hardly enter the core, i.e. the damping of the power of light passing the resulting decoupling interface through the optical fiber is very small. In order to adjust a desired damping, several similar electric arcs are therefore successively applied with time intervals between each other (i.e. pulsed) to the same intermediate position to be treated of the optical fiber. According to the present invention, from three to seven inclusive, in particular from four to five inclusive, electric arcs are successively applied.

In order to avoid mechanical weakening of the optical fiber at the decoupling interface 200, according to the present invention, care is been taken during electro-thermal treatment, that the optical fiber maintains substantially straightly aligned in the region of the decoupling interface 200.

Figure 3:
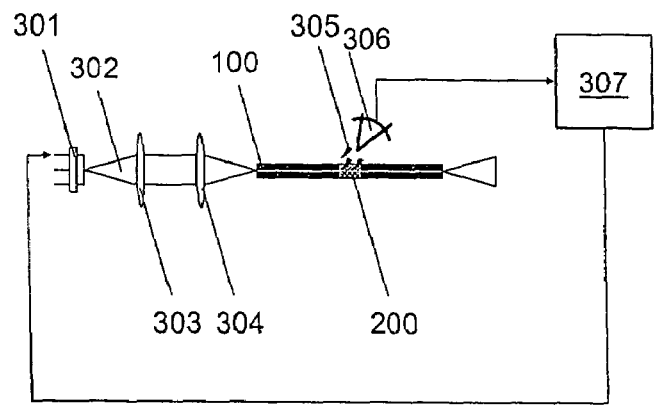
FIG. 3 shows a principle sketch of a device for monitoring of the light power guided through an optical fiber according to the present invention.
Figure 4:
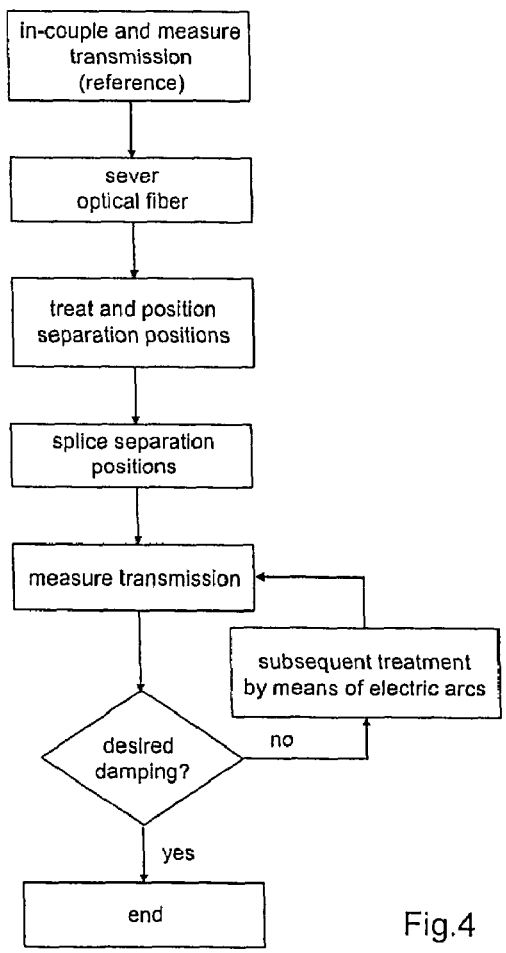
FIG. 4 shows a flow chart for modifying an optical fiber according to a first embodiment of the present invention.

FIG. 3 is an outline of an assembly of a fiber-coupled light source with integrated power monitor according to the present invention.

Light 302 emanating from a light source 301 is collimated by an optical system 303 and is coupled into an optical fiber '100 by means of a focusing optical system 304. With respect to its structure, the optical fiber 100, in a region where the optical fiber 100 is substantially straightly aligned (i.e. light is guided lossless in the optical fiber 100 by means of total reflection), is modified at a decoupling interface 200 in a way, that scattered light 305 emanates. The scattered light 305 is detected by a detector 306. The resulting detector signal output by the detector 306 can be supplied to an electronic control system 307 which controls the light source 301.

The decoupling interface 200 of the optical fiber 100 can be manufactured by different processes. One possible process according to a first embodiment of the present invention is demonstrated in FIG. 4 as a flow chart. In this process, at first the light power of light source 301 transmitted through the optical fiber 100 is determined as a "reference measurement". Thereafter, the optical fiber 100 is severed substantially perpendicular to the fiber axis, so that fiber pieces are formed.

The coating is removed from the resulting fiber pieces at their respective ends of the separation positions (so called "stripping") and the ends are cleaned. The end surfaces of the fiber pieces are broken straightly and in a controlled way (so called "cleaving"). In a splicing device, the fiber pieces are then positioned along a straight line and thereafter directly spliced to each other at their front surfaces. Subsequently, the splicing position is modified in such a way, that a part of the guided light power can emanate at the modified splicing position as scattered light. A non-perfect joint position may be generated to this end, for example by forming the splice with the two fiber ends having a minor lateral misalignment.

For example, the application of further electric discharge arcs is suitable for the modification, whereby a partial mixture of the materials of the core and the cladding in a peripheral region of the core is obtained, so that scattered light appears at the treated position. Preferably, the light power transmitted through the optical fiber is monitored during the electric arc treatment, and the electric arc treatment is continued until a desired damping of the light power transmitted through the optical fiber is obtained with respect to the reference measurement, for example 0.5 to 1 dB.

Figure 5:
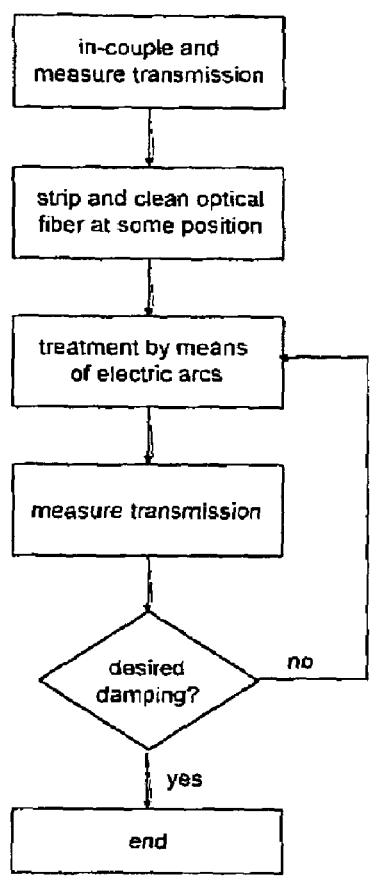
FIG. 5 shows a flow chart for modifying an optical fiber according to a second embodiment of the present invention.

An alternative procedure for modifying an optical fiber according to a second embodiment of the present invention is shown in FIG. 5 as a flow chart. Light is coupled into the fiber core at the fiber entry, and the transmitted light power is measured at the fiber end. The coating is removed from the optical fiber at the position to be treated, and the uncovered fiber cladding is cleaned. The fiber cladding is treated by means of electric arcs at the uncovered position while the optical fiber maintains straightly aligned, so that a partial mixture of the materials of the core and the cladding is obtained at this position, and as a result a part of the light is not guided through the optical fiber any longer, but emanates the optical fiber. The intensity of the scattered light can be adjusted by controlling the parameters of the electric arcs (e.g. duration, repetition frequency), in that the power transmitted through the optical fiber is monitored and the electric arc treatment is continued until a desired damping is obtained. In this procedure severing and newly splicing together of the optical fiber is not necessary, whereby a reduction of time, an improved mechanical stability and a better reproducibility of the results are obtained.

Figure 6:
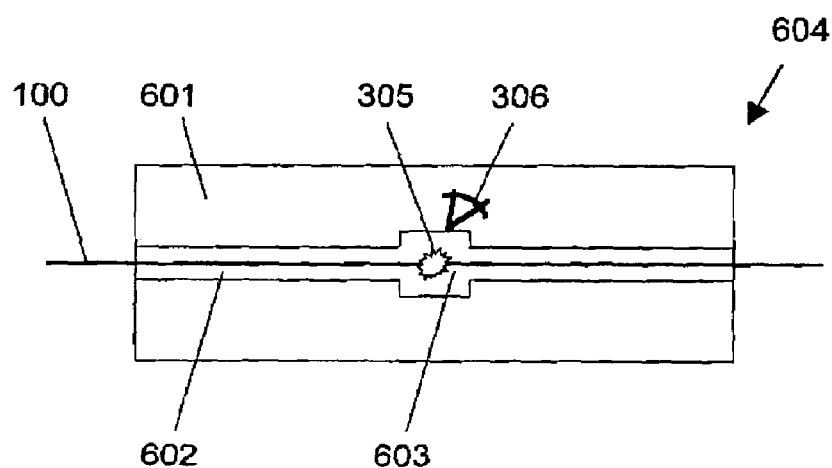
FIG. 6 shows a base body of a power monitor according to an embodiment of the present invention.

FIG. 6 shows a base body of a power monitor according to an embodiment of the present invention. The optical fiber 100 is glued into a holding block 601, which particularly surrounds and protects the decoupling interface 200. Scattered light 305 generated at the decoupling interface 200 is detected by a silicon based photodiode being used as detector 306, the photodiode being positioned in the base body 604.

In order to glue in the optical fiber 100, an adhesive 602 is used, which according to the present embodiment is a photo-polymer hardenable by light. A granular material 603 providing additional scattering centers may be admixed to adhesive 602 in order to be able to detect a preferably high portion of scattered light in the proximity of the decoupling interface 200. To this end, for example, a mixture of 50 weight percent adhesive and 50 weight percent glass powder (glass dust of glass spheres with a diameter of <50 µm) has proved to be suitable. The scattering centers formed thereby bring about a homogenizing of the angular distribution of the scattered light, and in particular allow for a detection of scattered light orthogonal to the fiber axis. Alternatively, fluorescent or phosphorescent substances can be admixed to the adhesive instead of glass powder in the proximity of the intermediate position 200, whereby an adaptation of the scattered light to the maximum sensitivity of the detector 306 may be realized.

When attaching the detector 306 at the decoupling interface 200, the detector 306 is moved until the measurement signal is up to a maximum in order to optimize the detection of scattered light.

The photodiode has to be protected from disturbing ambient light that would otherwise falsify the measurement signal. In order to obtain this protection, a light-absorbing material may be admixed to an adhesive being used to glue the photodiode into the base body 601. Said light-absorbing material varies according to the wavelength (UV, visible light, IR). Suitable materials for about 400 nm are, for example, silicon carbide or carbon powder.

Figure 7:
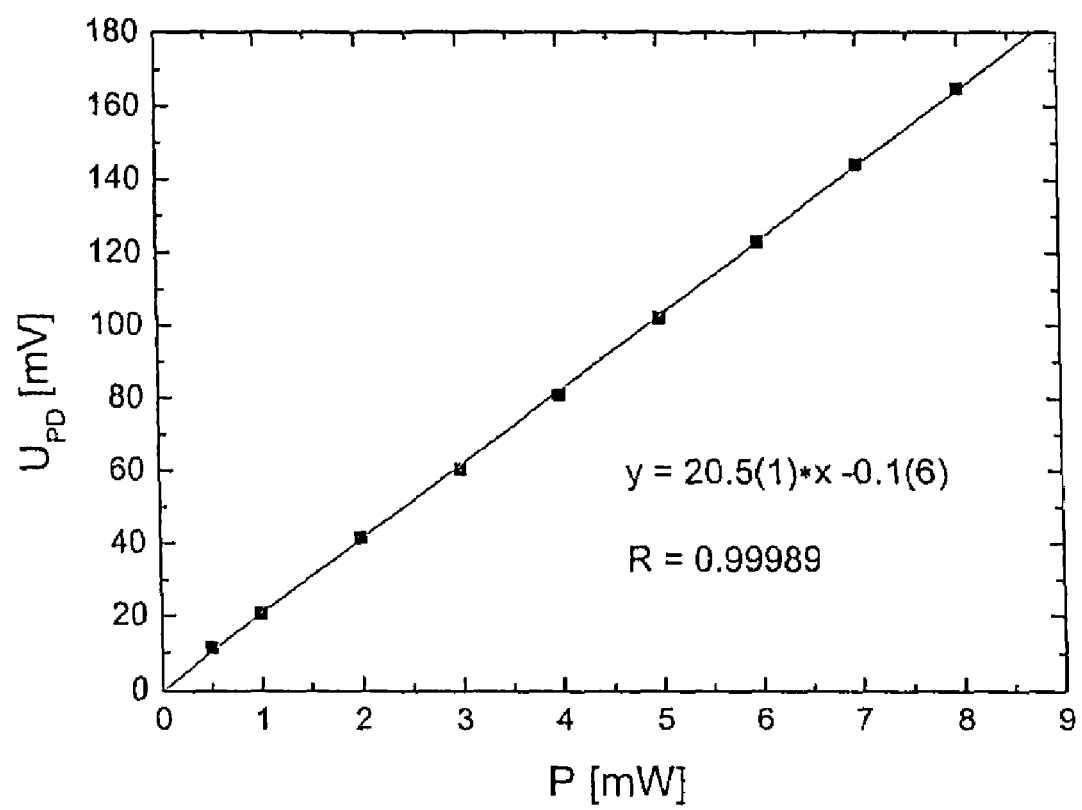
FIG. 7 shows a calibration curve of a power monitor according to FIG. 6.

Subsequent to manufacturing, the power monitor is calibrated once, and may then be integrated into a control loop, for example to control the light power coupled from the light source into the optical fiber. FIG. 7 shows a calibration curve, in which the voltage signal $U_{PD}$ measured by photodiode 306 is shown as a function of the light power P transmitted through the optical fiber 100.

The graph of the calibration curve, which is taken with a separate detector at the end of the optical fiber 100 in a distance of about 10 cm behind the decoupling interface 200, shows a linear-dependence with a correlation R=0.99989 between the signal of the scattered-light detector and the transmitted light power, as shown in FIG. 7. A linear regression yields for an equation of a straight line $y=m \cdot x+b$ a slope m of m=(20.5±0.1) mV/mW and an axis intercept b of b=(0.1±0.6) mV. Therefore, the offset is compliant with zero within the precision of the measurement.

With respect to the prior art, the present invention is distinguished in that the power monitor according to the present invention can be manufactured simply and cheaply, comprises a compact and space saving design and a mechanically robust construction. In particular, the decoupling of scattered light out of the optical fiber is effected without a microbend of the optical fiber, thereby increasing the mechanical stability of the optical fiber. Therefore, the decoupling of the scattered light out of the optical fiber is not effected by a mechanical shift of the angle of total reflection with respect to the direction of the incident light as in a bending decoupler, but is effected by the partial insertion of scattering centers in the interface region between the core and the cladding of the optical fiber, whereby parts of the light are incident upon the cladding substantially perpendicularly directed and, thus, are transmitted through the cladding. The manufacturing does not require expensive equipment, as for example a vacuum pump station as it is used in U.S. Pat. No. 4,923,273. A commercially available splicing device may be used to apply the electric arcs.

The manufacturing and use of the described power monitor according to the present invention does not provide the danger of an unintentional damage or destruction of the optical fiber. The mechanical stability of the optical fiber is not substantially-reduced. In particular, a bending of the optical fiber at the decoupling interface, considerably reducing the mechanical stability of the optical fiber, is avoided. The construction shows a high amount of stability with respect to mechanical impacts and a high long-term stability. Therefore, the power monitor according to the present invention is especially suitable for industrial applications of fiber-coupled light sources.

By monitoring the transmitted light power during the manufacturing process, the damping in the optical fiber resulting from the modification is controlled, and a defined portion of scattered light is generated for power monitoring. The functioning of the power monitor is not affected by a varying beam profile of the light source, as for example due to aging phenomena.

Due to the creation of additional scattering centers, for example by admixing of a granular material into a used adhesive, the utilizable portion of scattered light is optimized. The transmission of light through the optical fiber is not unintentionally affected, since the scattering centers are localized, i.e. are not distributed over the whole length of the optical fiber, and lie outside of the fiber core.

The described methods according to the present invention are applicable to single-mode fibers and multi-mode fibers in the same way without a substantial change of the necessary construction, since they are independent of the structure and the composition of the respective optical fiber. The method described in the second embodiment, wherein the optical fiber is not severed, in particular is also easily applicable and well suited for polarization-preserving optical fibers.

Furthermore, besides the described application of the described methods according to the present invention for passive fiber-optic waveguides, an application to laser-active optical fibers is possible, for example to optical fibers with a doped fiber core, which can be doped, for example, with Ytterbium, Erbium, Praseodymium or Neodymium, or a combination of these elements. Moreover, the described methods according to the present invention can also be applied to photonic crystal fibers.

Exemplary fields of use are a continuous "online"-monitoring of the power of a light source, such as a laser, for example to detect aging related variations in the light power.

Alternatively, the methods according to the present invention can also be applied to control a fiber in-coupling if, for example, piezo-electrically controlled optical coupling systems are used.

The invention claimed is:

1. A method for manufacturing an optical fiber with a decoupling interface for scattered light to monitor the power of light guided within said optical fiber, said optical fiber comprising a core having a first refractive index and a cladding surrounding said core, said cladding having a second refractive index being smaller than said first refractive index, a portion of said optical fiber in a region of said decoupling interface being substantially straightly aligned,
wherein the optical fiber is electro-thermally treated at an intermediate position within said substantially straightly aligned portion, such that a partial mixture of core material and cladding material and, thereby, formation of scattering centers occurs in an interface region between said core and said cladding, thereby forming said decoupling interface for scattered light;
wherein said decoupling interface is surrounded by a light scattering, light refracting or light reflecting material, or by a material being light absorbing and subsequently light emitting a portion of detactable scattered light thereby being modified.

2. The method according to claim 1, wherein said optical fiber is severed at said intermediate position substantially perpendicular to the fiber axis prior to said electro-thermal treatment of said optical fiber so that two free fiber ends result, and said two free fiber ends are directly spliced to each other at their front surfaces, said two spliced fiber ends thereby being substantially straightly aligned, and wherein said electrothermal treatment is performed as a subsequent treatment of the spliced intermediate position.

3. The method according to claim 2, wherein said splicing step of said two fiber ends is carried Out with a small lateral offset of the fiber ends.

4. The method according to claim 1, wherein during said electro-thermal treatment of said optical fiber the light power guided through the optical fiber is monitored, and wherein the electrothermal treatment is completed as soon as a desired damping of said power is achieved.

5. The method according to claim 1, wherein said decoupling interface is surrounded by a granular material.

6. The method according to claim 1, wherein said decoupling interface is surrounded by a fluorescent or phosphorescent material.

7. The method according to claim 5, wherein said granular material is glass powder.

8. The method according to claim 7, wherein said glass powder has a particle diameter of <100 μm.

9. The method according to claim 7, wherein said glass powder has a particle diameter of between 40 μm and 60 μm.

10. The method according to claim 1, wherein said electrothermal treatment of said intermediate position is carried out by applying an electric arc.

11. The method according to claim 1, wherein said electrothermal treatment of said intermediate position is carried out by applying several successive electric arcs having time intervals between each other.

12. The method according to claim 11, wherein the intensity of said electric arcs varies.

13. The method according to claim 1, wherein a detector for detecting scattered light emitted from said decoupling interface of said optical fiber is provided at said decoupling interface.

14. The method according to claim 13, wherein said decoupling interface and said detector are commonly surrounded by an absorbing material in order to provide protection against scattered light coming from undesired directions.

15. The method according to claim 14, wherein silicon carbide or carbon powder is used as absorbing material.

16. A use of an optical fiber manufactured according to the method described in claim 13 for monitoring the power of light from a light source when controlling the power of the light source, said light being guided through said optical fiber.

17. A use of an optical fiber manufactured according to the method described in claim 13 for monitoring the power of light from a light source when controlling the efficiency of in-coupling said light of said light source into said optical fiber, said light being guided through said optical fiber.

18. A device with an optical fiber and a control loop for controlling the power of light of a light source, said light being guided through said optical fiber, said optical fiber being manufactured according to the method described in claim 9 and whose detector being connected to the control loop as an actualvalue transducer.

19. The device according to claim 18, wherein said decoupling interface is surrounded by a fluorescent or phosphorescent material for a wavelength conversion of said scattered light.

20. The method according to claim 1, wherein the optical fiber is provided with at least one feature which refers to the respective feature of a single-mode fiber, of a multi-mode fiber, of a polarization-preserving optical fiber, of a laser-active optical fiber, or of a photonic crystal fiber.

* * * * *